(12) United States Patent
Takachi

(10) Patent No.: US 6,985,199 B2
(45) Date of Patent: Jan. 10, 2006

(54) LCD DEVICE AND METHOD FOR MANUFACTURING THE SAME

(75) Inventor: Masayuki Takachi, Kagoshima (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 10/770,017

(22) Filed: Feb. 3, 2004

(65) Prior Publication Data

US 2004/0156003 A1    Aug. 12, 2004

(30) Foreign Application Priority Data

Feb. 5, 2003    (JP) ............................. 2003-028850

(51) Int. Cl.
    *G02F 1/1337*    (2006.01)

(52) U.S. Cl. ...................................................... 349/123
(58) Field of Classification Search ................ 349/126, 349/123, 129
    See application file for complete search history.

(56) References Cited

U.S. PATENT DOCUMENTS 5,724,110 A * 3/1998 Majima ........................ 349/86
6,177,973 B1 * 1/2001 Lee et al. .................... 349/123

FOREIGN PATENT DOCUMENTS

| JP | 9-43629 | 2/1997 |
| JP | 11337967 A | * 12/1999 |
| JP | 2001-318380 | 11/2001 |

* cited by examiner

*Primary Examiner*—Robert H. Kim
*Assistant Examiner*—Wen-Ying Patty Chen
(74) *Attorney, Agent, or Firm*—McGinn IP Law Group, PLLC

(57) ABSTRACT

A pair of dummy orientation film patterns are provided for an orientation film used for aligning LC molecules in an LCD device. For a rubbing treatment of the orientation film, a rubbing cloth is cleaned by one of the dummy orientation film patterns before rubbing the orientation film, and also cleaned by the other of the dummy orientation film patterns after rubbing the orientation film thereby preparing next rubbing treatment for the next LCD device. The dummy orientation film pattern has a thickness larger than the thickness of the orientation film.

13 Claims, 4 Drawing Sheets

LCD DEVICE AND METHOD FOR MANUFACTURING THE SAME

BACKGROUND OF THE INVENTION (a) Field of the Invention

The present invention relates to an LCD (liquid crystal display) device and a method for manufacturing the same, and more particularly, to the structure of an LCD device having an orientation film suited to a rubbing treatment.

(b) Description of the Related Art

As is well known, an LCD device has a pair of substrates sandwiching therebetween an LC layer, wherein at least one of the substrates is transparent. By applying a voltage onto the LC layer to change the alignment state of the LC molecules, a desired image can be displayed on the LCD device while revealing the change of the alignment state by using a pair of polarizing plates.

An orientation film is generally used as a means for aligning the axes of LC molecules in a specified direction. The orientation film is obtained by a rubbing treatment wherein the orientation film is rubbed with a rubbing cloth such as rayon to form a plurality of minute stripe grooves on the surface of the orientation film. The LC molecules staying in contact with the orientation film are aligned in the direction of the stripe grooves. The alignment of the LC molecules can be changed by applying an external voltage onto the LC molecules thus aligned while adjusting the magnitude of the external voltage, thereby changing the amount of light passing through the polarizing plates.

It is to be noted that the rubbing treatment of the orientation film by using the rubbing cloth may involve a problem in that the orientation film is attached with a foreign particle and a scratch is formed on the surface of the orientation film due to the presence of the foreign particle during the rubbing. The foreign particle or the scratch on the surface of the orientation film disturbs the alignment state of the LC molecules, thereby incurring an undesirable luminance spot or an uneven luminance on the screen of the LCD device.

To avoid the above problem of the orientation film, the rubbing cloth is generally subjected to cleaning before the rubbing treatment. Although the cleaning may completely remove the foreign particles from the rubbing cloth, the above problem itself cannot be completely removed. More specifically, the rubbing cloth my be attached with a foreign particle staying in the area other than the display area before the rubbing treatment of the subject orientation film, or may be attached with a foreign particle during the prior rubbing treatment of another orientation film. In particular, the vicinity of the edge of the substrate on which the orientation film is formed may be contaminated by an etching residue generated during etching a multilayer film, or by a foreign particle generated by peeling-off of the multilayer film in the vicinity of the edge.

Patent Publication JP-A-2001-318380 describes a particle remover formed on a substrate of an LCD device. FIG. 5 shows the rubbing treatment in a perspective view, and FIG. 6 is a sectional view taken along line VI—VI in FIG. 5. As shown in FIG. 5, the particle removers 42 are disposed on both the front and rear edges of the substrate 40 on which an orientation film 41 is formed in the central area. The particle remover 42 extends in the direction normal to the direction in which the substrate advances during the rubbing treatment. As shown in FIG. 6, the particle remover 42 is formed by depositing an insulator film 42b on a stripe film 42a formed on the substrate 40, and includes a linear groove 42c formed on the insulator film 42b and a protrusion 42d disposed in the vicinity of the linear groove 42c on the insulator film 42b.

The stripe film 42a is made of chrome which is generally deposited as a material for a black matrix for shielding the TFTs etc., whereas the insulator film 42b is made of silicon oxide which is deposited as an insulating film for the TFTs. The particle remover 42 has a length larger than the width of the orientation film 41.

In the rubbing treatment, as shown in FIG. 5, the substrate 40 is moved in the direction of arrow for rubbing by a rubbing cloth 11, which first contacts with the particle remover 42 before the rubbing treatment. The particle remover 42, as shown in FIG. 6, removes the particles 13 from the rubbing cloth 11 at the linear groove 42c and the protrusion 42d, whereby the rubbing cloth 11 is cleaned and then effects a rubbing treatment for the orientation film 41.

The conventional technique shown in FIGS. 5 and 6, however, complicates the fabrication process for the LCD device due to forming the particle removers 42 on the substrate 40 on which the orientation film 41 is formed. In addition, the particles removed by the particle remover 42 may contaminate the orientation film 41 by entering the area for the orientation film 41 during or after the rubbing treatment.

Patent Publication JP-A-9(1997)-43629 describes a dummy electrode area outside the display area, for removing particles generated by a rubbing treatment by a rubbing cloth. More specifically, as shown in FIG. 7, the LCD device includes a TFT substrate 40 and a counter substrate (not shown) sandwiching therebetween a LC layer and bonded together by using a sealing. The counter substrate includes a counter electrode along the alignment surface thereof.

The TFT substrate 40 has a transparent conductive film, and includes a central display area 46 and a peripheral dummy electrode area 47. As shown in FIG. 8, the central display area 46 includes therein an array of pixel electrodes 43 and associated TFTs acting as switching devices for the pixel electrodes 43. The peripheral dummy electrode area 47 includes therein a plurality of dummy electrodes 44 arranged in an array extending from the pixel electrodes 43 in the display area 46. A thin orientation film 41 made of polyimide, for example, is formed on the entire area of the TFT substrate 40 by using a printing technique.

The orientation film 41 is rubbed by a rubbing cloth 11 attached onto a roller 10. The foreign particles generated by the initial stage of the rubbing treatment by the rubbing cloth 11 are captured in the groove formed between the dummy electrodes 44 in the peripheral dummy electrode area 47, to thereby reduce the particles to be captured in the groove formed between the pixel electrodes 43 in the central display area 46. This reduces the possibility of a short-circuited failure caused by the particles captured between the pixel electrodes 43 in the display area 46.

The particles generated by the rubbing treatment are captured in the groove formed between the dummy electrodes 44, which are arranged at a specified pitch. The number of dummy electrodes for capturing the particles is limited, and accordingly, the amount of particles captured between the dummy electrodes 44 is not sufficient. In addition, the particles captured between the dummy electrodes may move to the central display area 46 to degrade the image quality of the LCD device.

SUMMARY OF THE INVENTION

In view of the above problems in the conventional technique, it is an object of the present invention to provide an LCD device which is capable of providing a higher image quality after rubbing treatment of the orientation film.

The present invention provides an LCD device including an LC layer and first and second substrates sandwiching therebetween the LC layer, each of the first and second substrates mounting thereon an orientation film in a display area and a dummy orientation film pattern in a peripheral area, the dummy orientation film pattern being disposed apart from the orientation film.

The present invention also provides a method for manufacturing an LCD device including the steps of: forming a dummy orientation film pattern in a peripheral area apart from an orientation film formed in a display area; rubbing the orientation film with a rubbing cloth; rubbing the dummy orientation film pattern with the rubbing cloth.

In accordance with the LCD device and the method of the present invention, the dummy orientation film pattern disposed apart from the orientation film allows the rubbing cloth for rubbing the orientation film to be cleaned from foreign particles, and the foreign particles captured by the dummy orientation film pattern scarcely enter the display area due to the arrangement of the dummy orientation film pattern apart from the orientation film.

It is preferable that the dummy orientation film pattern include a plurality of stripe films extending parallel to one another, and that the stripe films have a thickness larger than a thickness of the orientation film. This improves the efficiency for capturing the foreign particles by the dummy orientation film pattern and further prevents the foreign particles captured in the dummy orientation film pattern from entering the orientation film.

The above and other objects, features and advantages of the present invention will be more apparent from the following description, referring to the accompanying drawings.

PREFERRED EMBODIMENTS OF THE INVENTION

Figure 1:
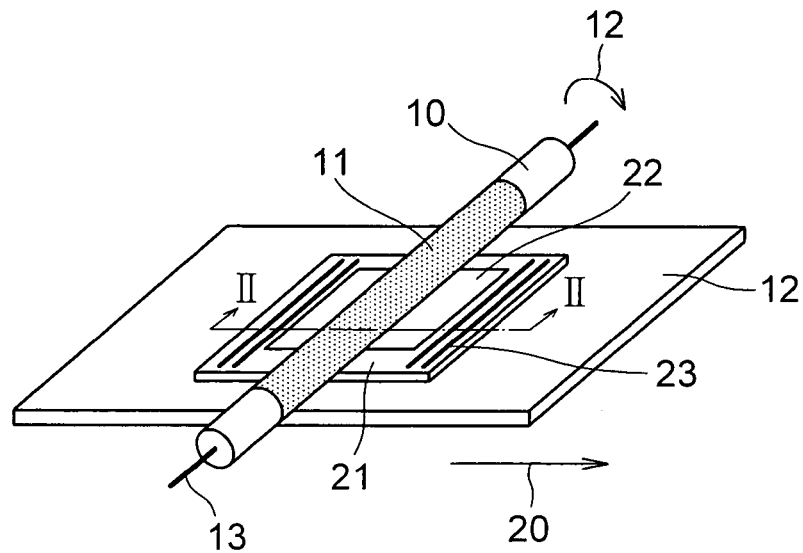
FIG. 1 is a perspective view of a rubbing treatment for rubbing an LCD device according to an embodiment of the present invention.

Now, the present invention is more specifically described with reference to accompanying drawings, wherein similar constituent elements are designated by similar reference numerals throughout the drawings.

Referring to FIG. 1, there is shown a rubbing treatment of an orientation film 22 formed on a TFT substrate 21, wherein the orientation film 22 is moved in the direction of arrow 20 by a rubbing stage 12 and subjected to a rubbing treatment by a rubbing cloth 11. The rubbing cloth 11 is attached onto the surface of a rubbing roller 10 rotating around a rotational axis 13 thereof.

Figure 2:
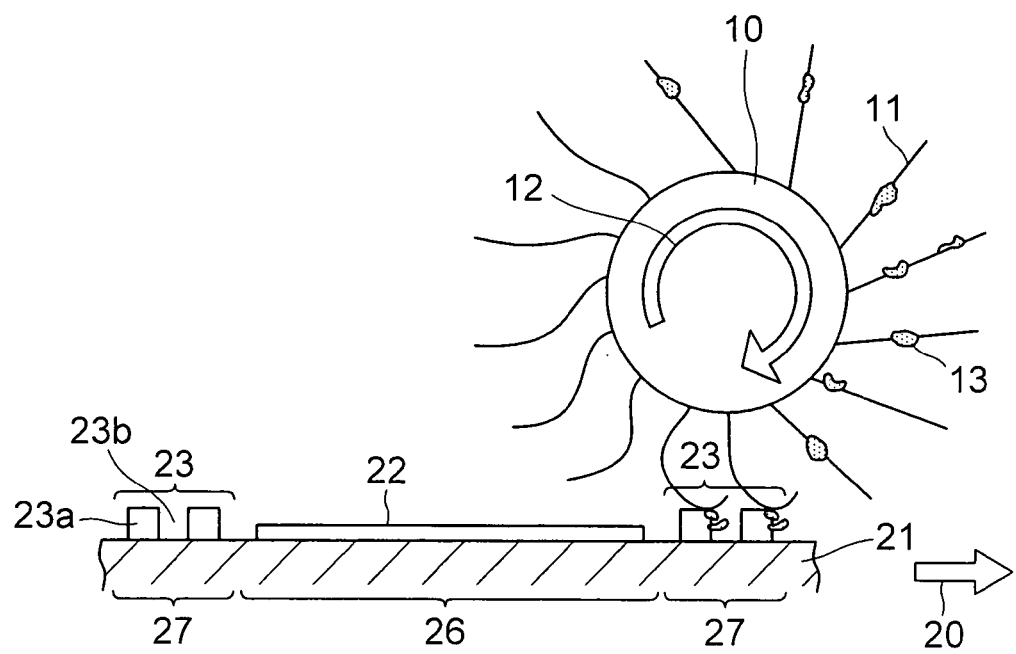
FIG. 2 is a sectional view of the rubbing treatment of FIG. 1 taken along line II—II in FIG. 1.

Referring to FIG. 2, orientation film 22 is disposed in the display area 26 of the TFT substrate 21. The dummy orientation film pattern 23 is disposed in the peripheral area, i.e., in the vicinity of each of the front edge and the rear edge of the TFT substrate 21, as viewed in the moving direction 20 of the TFT substrate 21 with respect to the rubbing cloth 11 during the rubbing treatment. Each dummy orientation film pattern 23 includes a pair of stripe films 23a extending in the direction normal to the moving direction 20 of the TFT substrate 21 and a depression 23b formed between the stripe films 23a.

The surface of the orientation film 22 is rubbed with the rubbing cloth 11 and thus provided with minute stripe grooves thereon by the rubbing cloth 11. It is to be noted that the dummy orientation film pattern 23 formed in the peripheral area 27 of the TFT substrate 21 is first contacted with the rubbing cloth 11 before the orientation film 22 reaches the rubbing cloth 11.

The stripe films 23a in the dummy orientation film pattern 23 have a thickness of 2000 angstroms at a maximum whereas the orientation film 22 has a thickness of 300 to 1200 angstroms. The stripe films 23a in the dummy orientation film pattern 23 extend beyond the lateral edges of the orientation film 22. The dummy orientation film pattern 23 has a function of removing foreign particles from the rubbing cloth 11 due to the larger thickness of the stripe films 23a in the dummy orientation film pattern 23.

The dummy orientation film pattern 23 is contacted with the rubbing cloth 11 during the movement of the TFT substrate 21. The front dummy orientation film pattern 23 disposed in the front peripheral area of the TFT substrate 21 removes foreign particles, if any, from the rubbing cloth 11 for cleaning the rubbing cloth 11 in advance, as shown in FIG. 2. The orientation film 22 is then contacted with the cleaned rubbing cloth 11 for forming the minute stripe grooves on the surface of the orientation film 22. The rubbing cloth 11 then contacts with the rear dummy orientation film pattern 23 formed in the vicinity of the rear edge of the TFT substrate 21. If a foreign particle is attached onto the rubbing cloth 11 during the rubbing treatment of the orientation film 22, the foreign particle is also removed from the rubbing cloth 11 by the rear dummy orientation film pattern 23 for preparing the next rubbing treatment.

The dummy orientation film pattern 23 is formed by a flexo-graphic printing technique using organic polyimide, which is also used as a material for forming the orientation film 22 in the display area 26.

The number of stripe films 23a in each dummy orientation film pattern 23 may be one or more. The stripe films 23a may be cut at a plurality of points in the extending direction thereof. In the latter case, it is preferable that the rubbing roller 10 be inclined with respect to the surface of the TFT substrate 21 in view of the efficient removal of the foreign particles.

Figure 3:
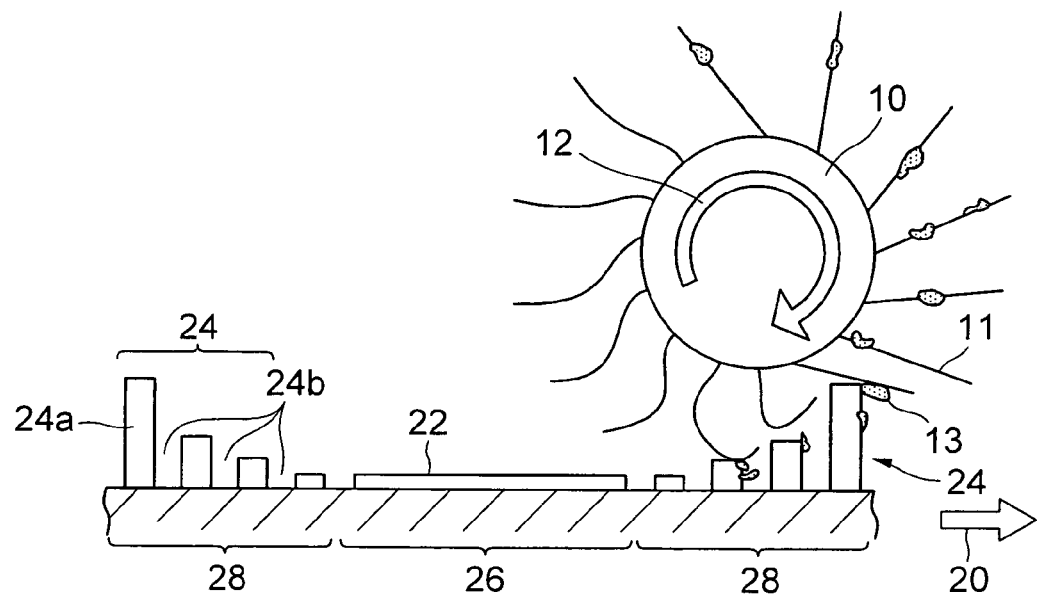
FIG. 3 is a sectional view of a modified rubbing treatment modified from FIG. 2.
Figure 4:
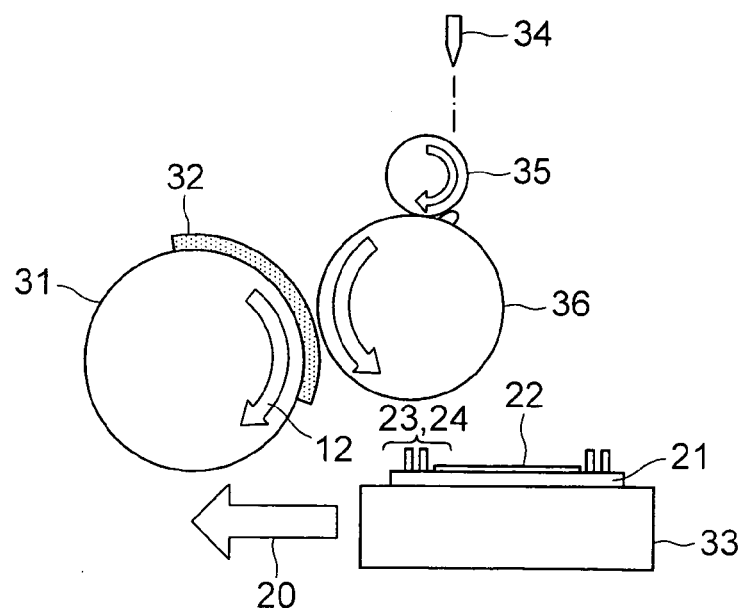
FIG. 4 is a schematic side view of a flexo-graphic printing system for forming the orientation film by using a printing technique.
Figure 5:
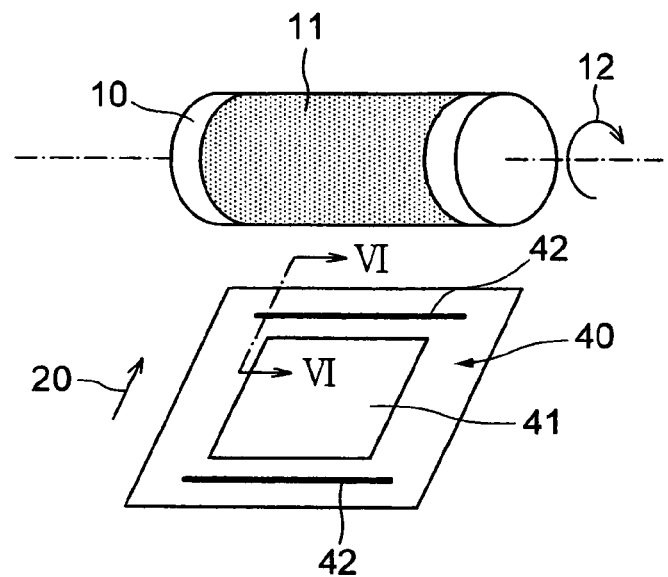
FIG. 5 is a perspective view of a conventional LCD device, showing a rubbing treatment of an orientation film by using a rubbing cloth.
Figure 6:
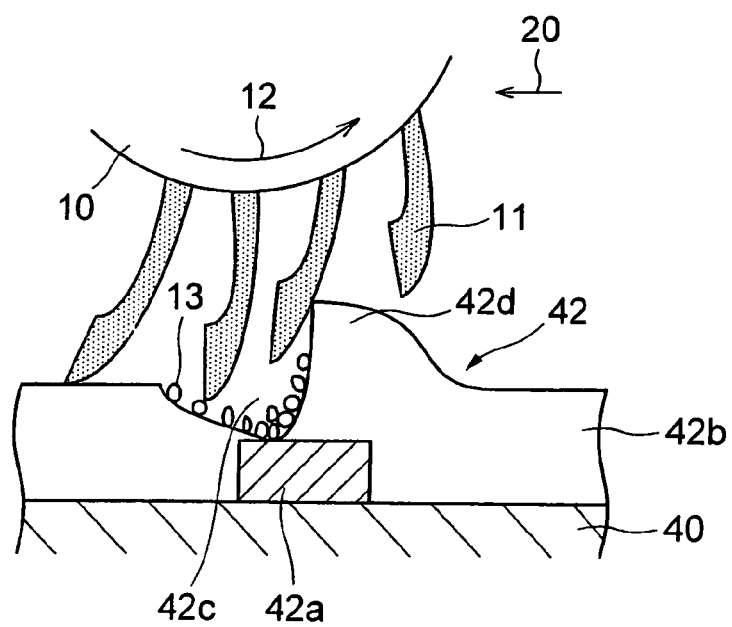
FIG. 6 is a sectional view taken along line VI—VI in FIG. 5.
Figure 7:
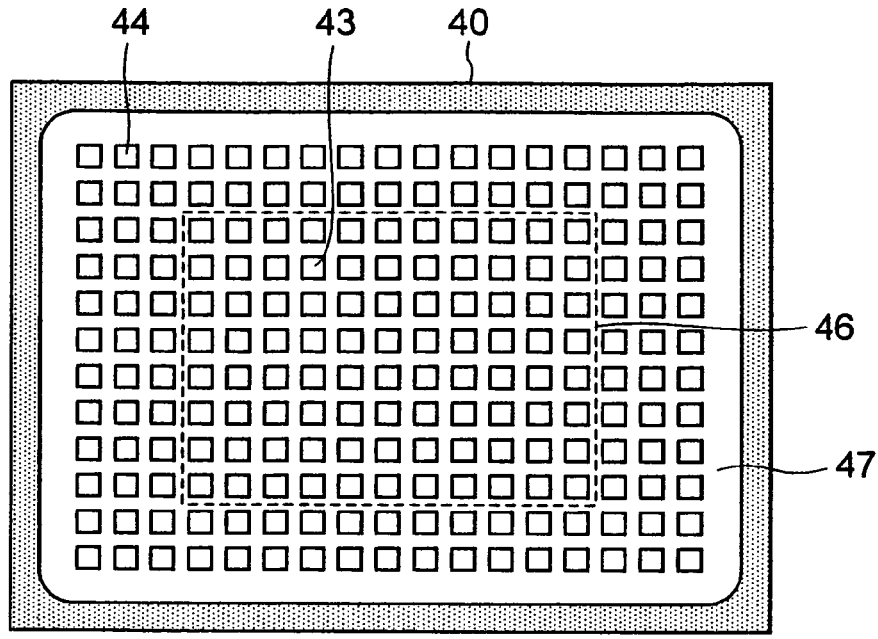
FIG. 7 is a top plan view of another conventional LCD device.
Figure 8:
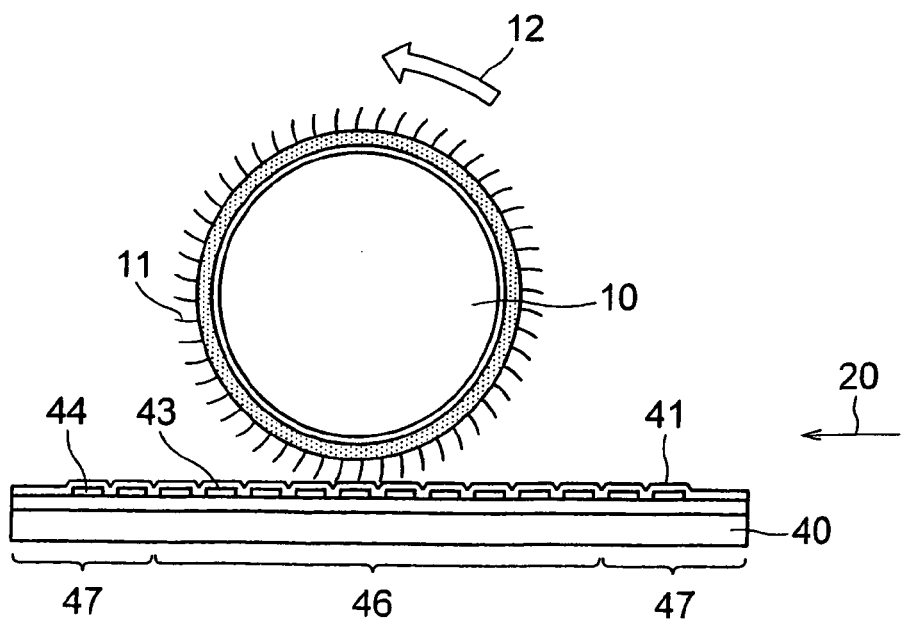
FIG. 8 is a sectional view of the LCD device of FIG. 7 during a rubbing treatment thereof.

Referring to FIG. 3, a modified dummy orientation film pattern 24 modified from the dummy orientation film pattern 23 of the above embodiment has a plurality of stripe films 24a having different thicknesses. More specifically, one of the stripe films 24a disposed outside another of the stripe films 24a in the dummy orientation film pattern 24 has a thickness larger than the thickness of the another of the stripe films 24, which has a thickness larger than the thickness of the orientation film 22. The innermost one of the stripe films 24a, as depicted in FIG. 4, has a thickness equal to the thickness of the orientation film 22. Other configurations are similar to those of the above embodiment shown in FIGS. 1 and 2.

The smaller thickness of the inner stripe film 24a as well as the equality between the thickness of the innermost stripe film 24a and the thickness of the orientation film 22 is employed in view that the tips of the rubbing cloth 11 do not jump at the innermost stripe film 24a during the movement of the TFT substrate 21. The jump of the rubbing cloth 11 may let the foreign particles attached thereto to fly onto the orientation film 22.

Referring to FIG. 4, there is shown the procedure of the flexo-graphic printing system for forming the orientation film 22 and the dummy orientation film pattern 23 or 24 on the TFT substrate 21 by a printing technique. A flexo-graphic printing block 32 made of rubber is attached onto the surface of a transcribing roller 31, which is controlled to roll on the TFT substrate 21 mounted on a printing stage 33. The material, organic polyimide, for forming the orientation film is carried by the flexo-graphic printing block 32 and then attached onto the TFT substrate 21 by printing to form the orientation film 22 and the dummy orientation film pattern 23 or 24 on the TFT substrate 21. For this purpose, a suitable amount of liquid polyimide is dropped onto the surface of a doctor roll 35, which transfers the dropped polyimide to the flexo-graphic printing block 32 on the transcribing roller 31 through an anilox roll 36.

The anilox roll 36 has a quadrangular-pyramid groove assembly having a lattice structure including 400 grooves per inch and a depth of 10 to 20 micrometers, although it is not specifically shown in the drawing. The polyimide is temporarily stored in the grooves, and transcribed onto the flexo-graphic printing block 32 upon the contact between the anilox roll 36 and the flexo-graphic printing block 32 on the transcribing roller 31. The flexo-graphic printing block 32 has thereon a large number of minute protrusions forming a specified pattern, which elastically deform upon the contact to eject the polyimide stored in the depressions between the minute protrusions toward the TFT substrate 21, thereby forming a pattern of the orientation film 22 and the dummy orientation film pattern 23 or 24.

For forming a dummy orientation film pattern 23 having a larger thickness than the thickness of the orientation film 22, suitable designs are selected for the number and the depth of the grooves formed on the anilox roll 36 and the density and the height of the minute protrusions formed on the flexo-graphic printing block 32.

A method for fabricating the LCD device having the orientation film 22 and the dummy orientation film pattern 23 as described above will be described hereinafter with reference to FIGS. 1 and 2.

The TFT substrate 21 mounting thereon the orientation film 22 and the dummy orientation film pattern 23 is mounted on the rubbing stage 12, as shown in FIG. 1. The TFT substrate 21 is then moved toward the rotating rubbing roller 10, thereby allowing the front dummy orientation film pattern 23 to pass by the rubbing cloth 11 while removing foreign particles from the rubbing cloth 11, as shown in FIG. 2. The rubbing cloth 11 then contacts with the orientation film 22 for allowing the orientation film 22 to be subjected to a rubbing treatment. Further, the TFT substrate 21 is moved in the direction of arrow 20 to allow the rear orientation film pattern 23 to pass by the cleaning cloth 11, thereby removing foreign particles 13, if any, from the rubbing cloth 11. The rubbing cloth 11 is thus prepared for a rubbing treatment for the next TFT substrate.

The peripheral areas of the TFT substrate 21 are preferably cut from the TFT substrate 21 after the rubbing treatment to reduce the dimensions of the TFT substrate 21 in the final product of the LCD device.

In the above embodiments, the larger thickness of the dummy orientation film pattern 23 or 24 effectively removes the foreign particles from the rubbing cloth 11. In addition, the arrangement of the dummy orientation film pattern 23 apart from the orientation film 22 prevents the foreign particles captured by the dummy orientation film pattern from entering the orientation film 22 in the central display area 26 after the rubbing treatment.

Since the dummy orientation film pattern 23 or 24 and the orientation film 22 are formed in a single printing process, the procedure for forming the dummy orientation film pattern 23 or 24 does not substantially complicate the fabrication process for the LCD device. The configuration that the stripe films 24a have reduced thicknesses toward the orientation film 22 prevents the particles attached onto the rubbing cloth 11 from entering the orientation film 22 due to the jump of the rubbing cloth 11.

Since the above embodiments are described only for examples, the present invention is not limited to the above embodiments and various modifications or alterations can be easily made therefrom by those skilled in the art without departing from the scope of the present invention. For example, the stripe film in the dummy orientation film pattern may be curved to form a curved pattern or cut at a plurality of points to form a dotted line pattern.

What is claimed is:

1. An LCD device comprising:
an LC layer and first and second substrates sandwiching therebetween said LC layer, each of said first and second substrates mounting thereon an orientation film in a display area and a dummy orientation film pattern in a peripheral area, said dummy orientation film pattern being disposed apart from said orientation film,
wherein said dummy orientation film pattern includes a plurality of stripe films extending parallel to one another.

2. The LCD device according to claim 1, wherein said stripe films have a thickness larger than a thickness of said orientation film.

3. The LCD device according to claim 1, wherein one of said stripe films has a thickness larger than another of said stripe films disposed nearer to said orientation film than said one of said stripe films.

4. The LCD device according to claim 3, wherein one of said stripe films which is nearest to said orientation film has a thickness equal to a thickness of said orientation film.

5. The LCD device according to claim 1, wherein each of said first and second substrates mounts thereon a pair of said dummy orientation film patterns.

6. The LCD device according to claim 1, wherein said dummy orientation film pattern comprises a material same as a material for said orientation film.

7. The LCD device according to claim 6, wherein said dummy orientation film pattern comprises polyimide.

8. The LCD device according to claim 1, wherein said orientation film and said dummy orientation film pattern are formed by a single flexo-graphic printing process.

9. A method for manufacturing an LCD device comprising:
- forming a dummy orientation film pattern in a peripheral area apart from an orientation film formed in a display area;
- rubbing said orientation film with a rubbing cloth; and
- rubbing said dummy orientation film pattern with the rubbing cloth,
- wherein said dummy orientation film pattern includes a plurality of stripe films extending parallel to one another.

10. The method according to claim 9, wherein a pair of said dummy orientation film patterns are formed near the opposite edges of said orientation film.

11. The method according to claim 9, wherein said stripe films have a thickness larger than a thickness of said orientation film.

12. The method according to claim 9, wherein one of said stripe films has a thickness larger than another of said stripe films disposed nearer to said orientation film than said one of said stripe films.

13. The method according to claim 12, wherein one of said stripe films which is nearest to said orientation film has a thickness equal to a thickness of said orientation film.

* * * * *